US 9,657,819 B2

(12) United States Patent
Sebert

(10) Patent No.: US 9,657,819 B2
(45) Date of Patent: May 23, 2017

(54) ADJUSTING DEVICE

(71) Applicant: Gerald Sebert, Bietigheim-Bissingen (DE)

(72) Inventor: Gerald Sebert, Bietigheim-Bissingen (DE)

(73) Assignee: GERALD SEBERT GMBH, Bietigheim-Bissingen (DE)

(*) Notice: Subject to any disclaimer, the term of this patent is extended or adjusted under 35 U.S.C. 154(b) by 0 days.

(21) Appl. No.: 15/143,716

(22) Filed: May 2, 2016

(65) Prior Publication Data

US 2016/0348773 A1    Dec. 1, 2016

(30) Foreign Application Priority Data

May 29, 2015   (EP) ..................................... 15169826
Nov. 3, 2015   (DE) .................... 20 2015 007 728 U

(51) Int. Cl.

| F16H 25/16 | (2006.01) |
|---|---|
| B05B 15/08 | (2006.01) |
| B25J 15/08 | (2006.01) |
| B05B 15/06 | (2006.01) |
| B24B 55/02 | (2006.01) |

(Continued)

(52) U.S. Cl.
CPC ........... F16H 25/16 (2013.01); B05B 15/066 (2013.01); B23Q 11/10 (2013.01); B23Q 11/1076 (2013.01); B24B 55/02 (2013.01); B25J 15/0028 (2013.01); B25J 15/08 (2013.01); B05B 15/08 (2013.01)

(58) Field of Classification Search
CPC ....... F16H 25/16; B05B 15/066; B05B 15/08; B23Q 11/10; B23Q 11/1076; B24B 55/02; B25J 15/0028; B25J 15/08; B25J 15/086; B25J 15/10; B25J 15/103
USPC ..................................... 294/116, 95; 279/35
See application file for complete search history.

(56) References Cited

U.S. PATENT DOCUMENTS 3,005,599 A * 10/1961 Padelt ................... G03B 19/04
                                                    192/93 R
4,121,868 A * 10/1978 Pierce ...................... B66C 1/66
                                                    279/37

(Continued)

FOREIGN PATENT DOCUMENTS

| DE | 29 05 579 A1 | 9/1979 |
|---|---|---|
| EP | 1 911 548 A1 | 4/2008 |
| EP | 2 286 964 A1 | 2/2011 |

OTHER PUBLICATIONS

Office Action of European Patent Office issued in Application No. 15169826.3 with English translation of category of cited documents dated Dec. 3, 2015 (8 pages).

*Primary Examiner* — Dean Kramer
(74) *Attorney, Agent, or Firm* — Flynn, Thiel, Boutell & Tanis, P.C.

(57) ABSTRACT

An adjusting device, a device for directing manufacturing aids including an adjusting device, and a gripper device having an adjusting device. The adjusting device includes a body and an adjustment plate mounted on the body for rotation about a central axis. The adjustment plate has two guide slots distributed around the circumference for adjustment objects mounted on the body so as to be pivotable about tangential pivot axes, wherein centerlines of the guide slots extend about the central axis along a spiral path.

18 Claims, 15 Drawing Sheets

(51) Int. Cl.
*B23Q 11/10* (2006.01)
*B25J 15/00* (2006.01)

(56) References Cited

U.S. PATENT DOCUMENTS

| | | | | |
|---|---|---|---|---|
| 4,765,669 A | * | 8/1988 | Meier | B25J 15/103 |
| | | | | 294/106 |
| 5,125,709 A | | 6/1992 | Meier, Jr. | |
| 5,378,033 A | * | 1/1995 | Guo | A61F 2/583 |
| | | | | 294/115 |
| 8,733,675 B2 | * | 5/2014 | Leber | B05B 1/18 |
| | | | | 239/436 |

* cited by examiner

ADJUSTING DEVICE

CROSS-REFERENCE TO RELATED APPLICATIONS

This claims priority from European Patent Application No. 15169826.3, filed May 29, 2015 and German Patent Application No. 20 2015 007 728.5, filed on Nov. 3, 2015, the disclosures of which are hereby incorporated by reference in their entireties into this application.

FIELD OF APPLICATION AND PRIOR ART

The invention relates to an adjusting device comprising an adjustment plate mounted so as to be rotatable about a central axis. The invention also relates to a device for directing manufacturing aids and/or to a gripper device having an adjusting device.

Various applications, in which a plurality of elements that are arranged in a manner distributed around the circumference of an adjustment plate are adjusted by means of rotation of the adjustment plate about a central axis, are known.

For example, EP 1 911 548 A1 discloses a cooling device for a milling machine or the like, which comprises a base plate and a plurality of nozzles attached in a pivotable manner to the base plate. In order to pivot the nozzles, provision is made of a statically arranged guide plate in the form of a circular ring, having first guide slots, extending in the radial direction, for the nozzles, and of an adjustment plate, likewise in the form of a circular ring, having linear second guide slots, extending in an inclined manner with regard to the tangential direction, for the nozzles, wherein by rotation of the adjustment plate relative to the guide plate, the nozzles are pivoted in the first guide slots of the guide plate in the direction of a central axis. The second guide slots in the adjustment plate extend in an inclined manner with regard to the tangential direction, and so the distance of a contact point of a second guide slot and of the nozzle accommodated therein from the central axis changes on rotation of the adjustment plate. In order to avoid tilting of the nozzles in the guide slots during pivoting and to allow the use of this adjusting device in the first place, the nozzles have to be guided in the slots with sufficient play. In addition, the guide slots are configured with a continuous chamfer or a radius on an outer side remote from the pivot axes of the nozzles.

PROBLEM AND SOLUTION

The present invention addresses the problem of creating an improved adjusting device comprising an adjustment plate. The invention also addresses the problems of creating apparatuses in which the adjusting device is usable.

According to a first aspect, an adjusting device comprising a basic body and an adjustment plate mounted on the basic body so as to be rotatable about a central axis is provided, wherein the adjustment plate has at least two guide slots, arranged in a manner distributed around the circumference, for adjustment objects mounted on the basic body so as to be pivotable about tangential pivot axes, wherein centrelines of the guide slots each extend about the central axis along a spiral path.

The adjustment objects accommodated in the guide slots are inclined on account of the contact with walls of the guide slots on rotation of the adjustment plate.

In order to take a varying inclined position of the adjustment objects with regard to the central axis and an associated changed cross section of the adjustment objects in contact with the guide slots into account, in one configuration a width of the guide slots varies over a course along the spiral path. In other words, in this configuration the guide slots are designed such that they reproduce the elliptical intersection of a cylindrical adjustment object with a plane of the adjustment plate in the respective inclined position of the adjustment object. The exact design of the guide slots should be selected in a suitable manner by a person skilled in the art depending on the application, taking a required maximum adjustment angle, the precision to be maintained, a design of the adjustment objects etc., into account. The guide slots in this case have walls with a convex shape in one configuration.

In an alternative configuration, in order to take a varying inclined position of the adjustment objects with regard to the central axis into account, walls of the guide slots have an inclination angle that varies continuously with the inclined position over a course along the spiral path.

The guide slots which extend along a spiral path and the walls of which have a continuously changing inclination angle are also referred to as spiral slots in the context of the application. The design, according to the invention, of the guide slots as spiral slots allows a precise adjusting movement of the adjustment objects without tilting while the adjustment objects are being guided in the guide slots with little play.

The adjustment objects are pivoted about tangential pivot axes by means of the adjusting device. In the context of the application, the expression tangential pivot axes is used to refer to axes which lie in a tangential direction of an imaginary circle arranged coaxially with the central axis. The adjustment objects are thus pivoted in radial planes with respect to the central axis. In one configuration, provision is made for the adjustment objects to be mounted in the basic body so as to be pivotable in any desired direction relative to the central axis, wherein a movement by means of a positionally fixed guide plate is limited to a pivoting movement about tangential pivot axes.

In advantageous configurations, a bearing shaft is assigned to each of the adjustment objects and the basic body has bearing receptacles for the adjustment objects, wherein the adjustment objects are mounted in the bearing receptacles by means of the bearing shafts so as to be pivotable about positionally fixed tangential pivot axes. As a result, a simple design is possible. The bearing receptacles are accessible from a side of the basic body away from the adjustment plate, wherein a cover for closing the bearing receptacles is provided. Openings, by way of which the adjustment objects are guided, are provided in the basic body in the direction of the adjustment plate in this design. The openings are preferably designed as slots that extend in the radial direction with respect to the central axis, such that the openings additionally assume a guide function. However, other designs are also conceivable. In other configurations, the bearing receptacles are directed towards the adjustment plate, wherein the adjustment plate can also assume the function of a covering element for the bearing receptacles.

In advantageous configurations, the basic body has a rotationally symmetrical cutout, wherein the adjustment plate is mounted in the cutout so as to be rotatable about the central axis. As a result, the adjusting device is designable as a compact assembly with a small overall height.

In advantageous configurations, a cover element for covering the adjustment plate is provided, wherein the cover element has slots that extend in the radial direction from the central axis. The cutout provided for the adjustment plate in the basic body is dimensioned in a sufficiently deep manner in one configuration, such that the cover element is likewise insertable into the cutout. In other configurations, the cover element is placed on the basic body. The slots extend in the radial direction with respect to the central axis. In one configuration, the slots have a width which corresponds approximately to the diameter of the adjustment objects, such that the slots additionally assume a guide function. In other configurations, the slots are dimensioned such that adjustment objects are guided with a great deal of play through the slots and the slots do not assume a guide function for the adjusting movement. As a result, contact and wear phenomena that result from the contact are avoided.

In order for the adjustment plate to be moved, in one configuration the latter has, on an outer circumference, a toothing and/or an adjusting lever for a drive. A drive is in this case designable as a motorized drive or as a crank or adjusting wheel for a manual drive.

In one configuration, an electromotive adjusting device comprising an actuator for an adjusting movement of the adjustment objects is provided. Such an adjusting device is usable in an appropriate manner independently of a design of the guide slots.

In particular, provision is made in advantageous configurations for the actuator of the electromotive adjusting device to be connected to the adjustment plate in a driving manner by means of a coupling mechanism. The coupling mechanism allows a rotary movement of the actuator, to be more precise of the drive shaft of the actuator, to be converted into a reciprocating or oscillating movement of the adjustment plate about the central axis.

The coupling mechanism is designable in a suitable manner by a person skilled in the art depending on the application. In one configuration, the coupling mechanism comprises an eccentric that is rotatable about an eccentric axis and is drivable about the eccentric axis by means of the actuator for a rotary movement.

In another configuration, the adjustment plate has an element arranged coaxially with the central axis, in particular a shaft, extending in the direction of the central axis, for a drive. In such a design, too, both a motorized drive, in particular an electromotive drive, or a manual drive is possible. Depending on the requirements, the element, in particular the shaft, is manufactured in one piece with the adjustment plate or connected thereto for conjoint rotation. Connection takes place in one configuration by means of suitable, non-destructively releasable coupling means. In other configurations, the components are not connected in a non-destructively releasable manner, for example welded.

The adjusting device is usable in a suitable manner in a multiplicity of applications.

According to a second aspect of the invention, a device for directing manufacturing aids for a machine tool is created, said device comprising at least two movable nozzles and an adjusting device for an adjusting movement of the nozzles. Adjustment objects of the adjusting device are thus the movable nozzles. By means of the adjusting device, it is in this case possible to direct the nozzles at a particular point, in particular a cutting or penetration point of a tool, such as a drill, a milling tool, a grinding wheel or the like. The manufacturing aid is for example air.

In advantageous configurations, the at least two nozzles are designed as coolant nozzles. The manufacturing aid is in this case a coolant, in particular a cooling liquid.

In one configuration, the nozzles are all directed at a common point in each adjusting position. In advantageous configurations, the at least two nozzles of the device have inclined positions with regard to the central axis that differ from one another in each adjusting position. The nozzles are thus not directed at a common point. This can be advantageous for the targeted feed of coolant at two locations. For example, it is conceivable to direct a coolant both to a drill tip and to a second location on the drill. During an adjusting movement by means of the adjustment plate, the nozzles are in this case adjusted through the same adjustment angle in one configuration. In other configurations, the nozzles are adjusted through different adjustment angles by corresponding designs of the guide slots.

Preferably, more than two nozzles are provided, wherein at least some of the nozzles have inclined positions with regard to the central axis that correspond in groups or pairs. The nozzles are thus directed in groups or pairs at a common point, in particular a cutting or penetration point.

In advantageous configurations, the basic body and the adjustment plate have a basic shape in the form of a circular ring or circular ring segment. The device can be arranged around the tool, wherein for example a tool axis and the central axis of the adjusting device are arranged coaxially.

According to a third aspect, a gripper device comprising at least two movable fingers and an adjusting device for an adjusting movement of the fingers is created. Preferably, the gripper device has three or four fingers. The fingers are in this case the adjustment objects of the adjusting device, wherein, by rotation of the adjustment plate, the fingers are moved towards one another to grip an object or away from one another to release the object.

The fingers are preferably arranged with corresponding inclined positions with regard to the central axis in each adjusting position and the guide slots of the adjusting device are designed to be congruent such that the fingers carry out synchronous adjusting movements.

BRIEF DESCRIPTION OF THE DRAWINGS

Further advantages and aspects of the invention can be gathered from the following description of preferred exemplary embodiments of the invention, which are explained with reference to the schematic figures, in which.

DETAILED DESCRIPTION OF THE EXEMPLARY EMBODIMENTS

Figure 1:
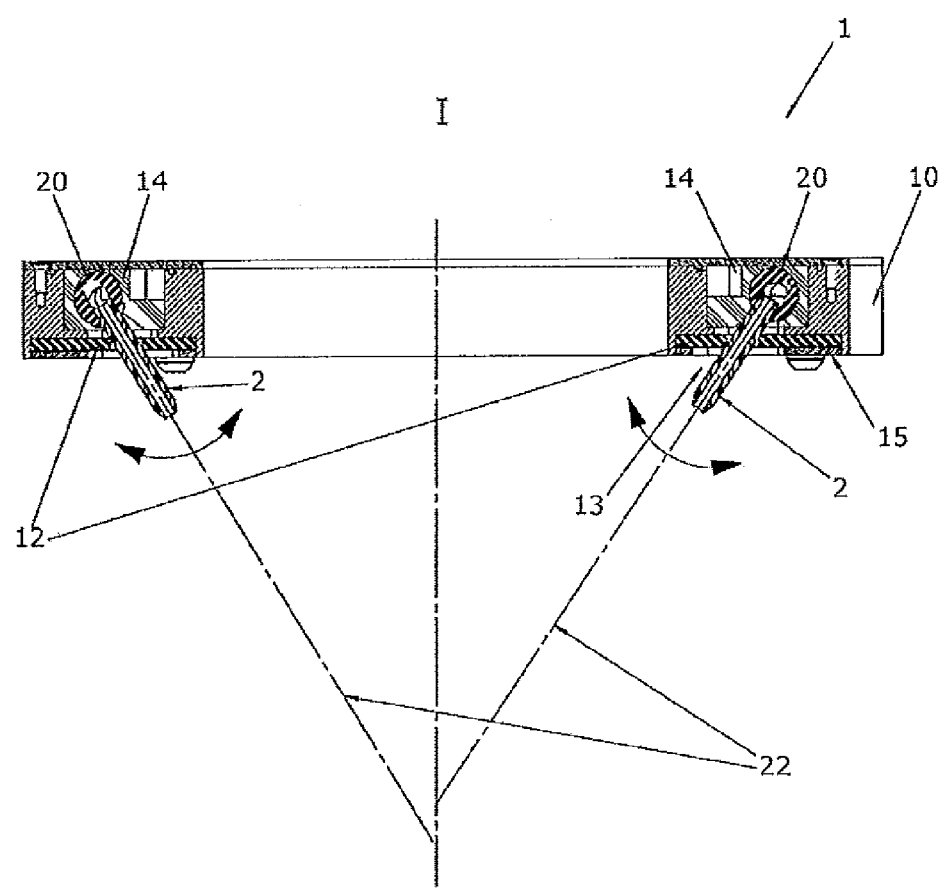
FIG. 1 shows an adjusting device in a sectional side view.

FIG. 1 schematically shows an adjusting device 1 comprising a basic body 10 and an adjustment plate 12 mounted on the basic body 10 so as to be rotatable about a central axis I. The basic body 10 and the adjustment plate 12 each have an area in the form of a circular ring. The illustrated basic body 10 has a rotationally symmetrical cutout 13, to be more precise a cutout 13 in the form of a circular ring, in which the adjustment plate 12 is received in a rotatable manner.

Mounted on the basic body 10 are adjustment objects 2. For this purpose, the basic body 10 has bearing receptacles 14 on a side away from the adjustment plate 12. A bearing shaft 20 is assigned to each of the adjustment objects 2. The adjustment objects 2 are—as indicated by arrows—mounted in the bearing receptacles 14 by means of the bearing shafts 20 so as to be pivotable about positionally fixed tangential pivot axes. The bearing receptacles 14 are accessible from a side away from the cutout 13 in order to insert the adjustment objects 2. In other configurations, the bearing receptacles 14 are open in the direction of the cutout 13, wherein the adjustment plate 12 also serves as a covering element for the bearing receptacles 14.

A cover element 15 is provided on a side of the adjustment plate 12 that is remote from the basic body 10.

The adjustment objects 2 have different inclined positions with regard to the central axis I, such that jets 22 that extend from the adjustment objects 2 are directed at different points on the central axis I.

The adjustment objects 2 are pivotable about their pivot axes by rotation of the adjustment plate 12 relative to the basic body 10.

Figure 2:
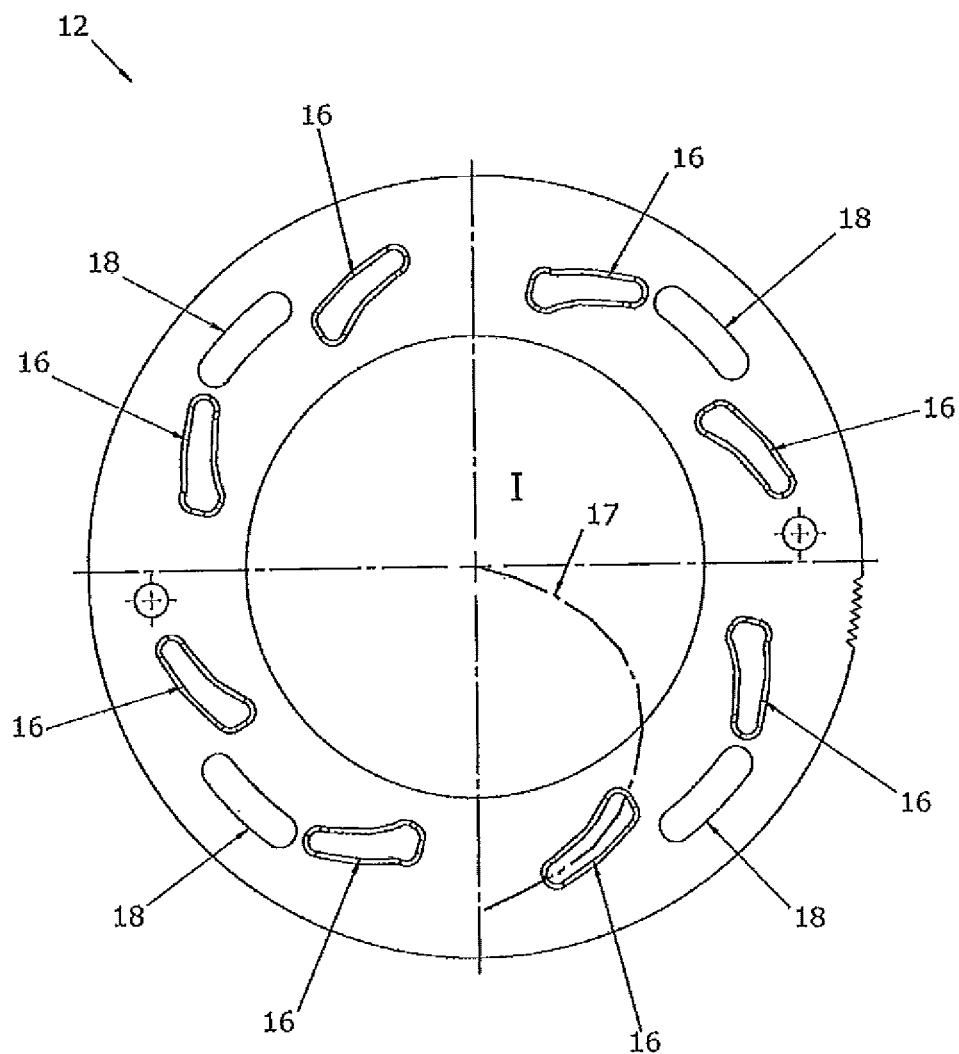
FIG. 2 shows an adjustment plate for an adjusting device according to FIG. 1 in plan view.
Figure 3:
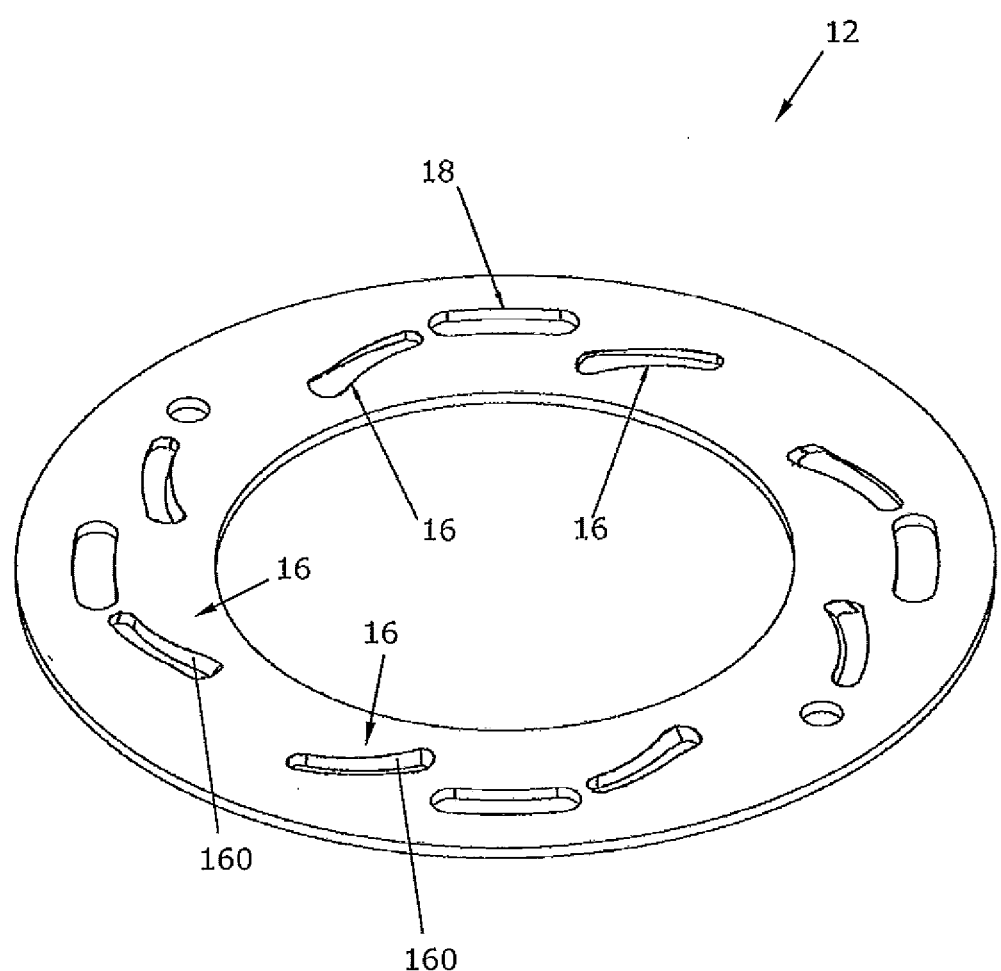
FIG. 3 shows the adjustment plate similar to FIG. 2 in a perspective illustration.

FIG. 2 shows an adjustment plate 12 for the adjusting device 1 according to FIG. 1 in plan view. FIG. 3 shows a similar adjustment plate 12 in a perspective illustration. The adjustment plates 12 illustrated in FIGS. 2 and 3 each have eight guide slots 16 which are arranged in a manner distributed around the circumference and the centrelines of which each extend about the central axis I along a spiral path 17 illustrated schematically in FIG. 2 by way of a dashed line.

The adjustment plates 12 also each have four slotted holes 18 that extend in the circumferential direction and serve to fasten the adjustment plate 12 to the basic body 10 in a rotatable manner.

In order to be able to guide the cylindrical adjustment objects in as play-free a manner as possible, in the embodiment of the adjustment plates 12 that is illustrated in FIGS. 2 and 3, provision is made in each case for a width of the guide slots 16 to vary in the radial direction. In this case, the width of the guide slots is in each case adapted to a necessary degree of opening that results from the inclined position, wherein the width of the guide slots in the radial direction increases in a manner corresponding to the necessary degree of opening that increases with the inclined position. In other words, the width of the guide slots in the radial direction decreases with increasing distance from the central axis. In the exemplary embodiment illustrated, an inclined position of the adjustment objects 2 is intended to be increased with anticlockwise rotation.

In the embodiment illustrated in FIGS. 1 and 2, the guide slots 16 each have walls with a convex shape.

In the embodiment according to FIG. 3, the guide slots 16 are designed as what are referred to as spiral slots. As can be seen in FIG. 3, walls of these spiral slots have an inclination angle that varies continuously with the inclined position of the adjustment objects 2 over a course along the spiral path 17, in order to take a varying inclined position of the adjustment objects 2 (cf. FIG. 1) with regard to the central axis I into account.

Figure 4:
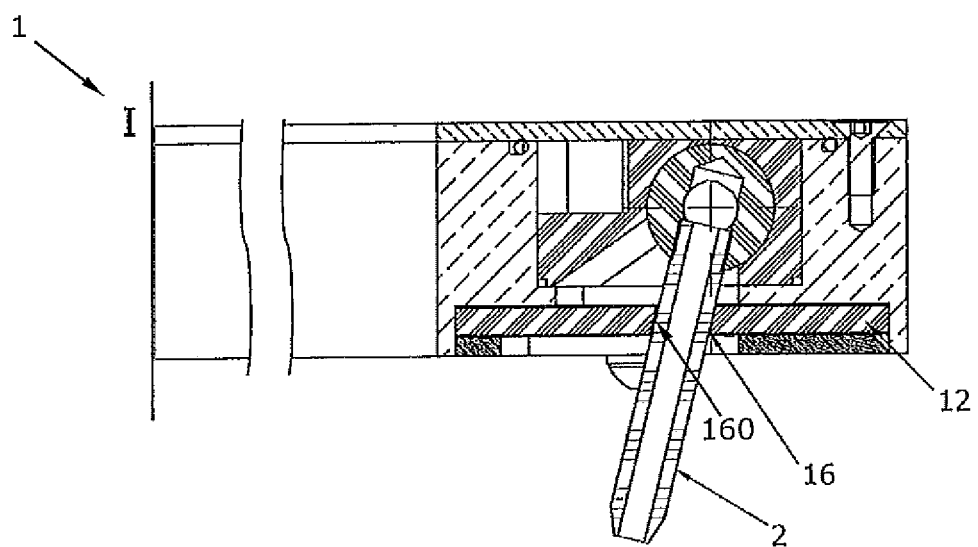
FIG. 4 shows a part of the adjusting device according to FIG. 1 with an adjustment object in a sectional side view.

FIG. 4 shows a part of an adjusting device 1 similar to FIG. 1 with an adjustment plate 12 according to FIG. 3 and with an adjustment object 2 in a sectional side view, wherein the adjustment object 2 has been transferred into an inclined position with regard to the central axis I by rotation of the adjustment plate 12. As can be seen in FIG. 4, the adjustment objects 2 touch the walls 160 of the guide slots 16 along a line. The adjustment objects 2 are transferred into a different inclined position with regard to the central axis I by rotation of the adjustment plate 12, wherein the inclination angles of the walls 160 vary such that the adjustment objects 2 touch the walls 160 of the guide slots 16 in every inclined position along a line.

Figure 5:
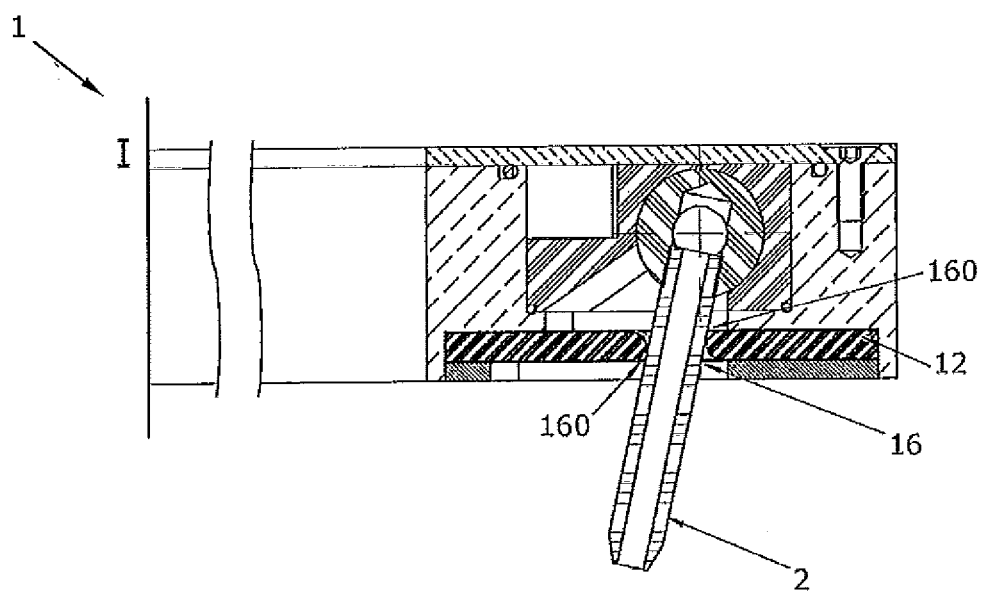
FIG. 5 shows a part of an adjusting device similar to FIG. 1 with an adjustment object in a sectional side view.

FIG. 5 shows a part of the adjusting device 1 according to FIG. 1 with an adjustment plate 12 according to FIG. 2 and with an adjustment object 2 in a sectional side view. In contrast to the embodiment according to FIG. 4, the walls 160 of the guide slots 16 are not inclined but are provided with radii. When the adjustment plate 12 is rotated, an abutment point of the adjustment object 2 against the inner side of the guide slot extends away downwards along a predefined radius. By contrast, an abutment point of the adjustment object 2 against the outer side of the guide slot extends away upwards along a predetermined radius.

Figure 6:
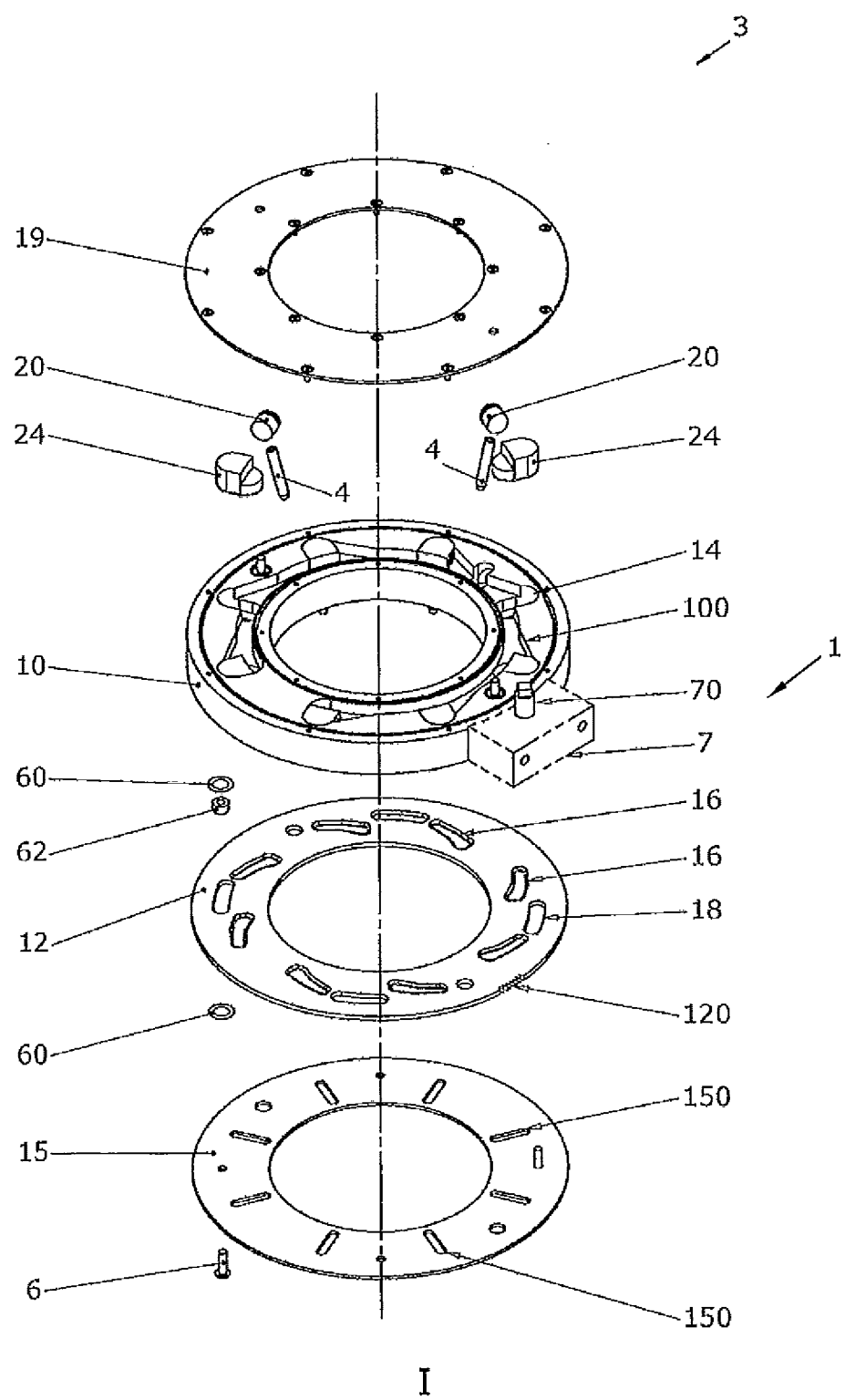
FIG. 6 shows a first embodiment of a device for directing manufacturing aids for a machine tool.

FIG. 6 shows an exploded illustration of parts of a device 3 for guiding manufacturing aids for a machine tool (not illustrated), to be more precise a device for feeding coolant, comprising a plurality of, specifically eight nozzles 4 designed as coolant nozzles and an adjusting device 1 having a basic body 10 and an adjustment plate 12.

The nozzles 4 are arranged in bearing receptacles 14 in the basic body 10 in a manner distributed around the circumference thereof by means of bearing shafts 20 and bearing covers 24. Coolant is fed via ducts 100 worked into the basic body 10. For sealing, a plurality of O-rings (not illustrated) and a covering element 19 are provided.

In order to cover the adjustment plate 12, a cover element 15 is provided, wherein the cover element 15 has slots 150, extending in the radial direction from the central axis I, for the adjustment objects designed as nozzles 4. The cover element 15 and the adjustment plate 12 are fastened to the basic body 10 by means of screws 6, washers 60 and fixing sleeves 62. The fixing sleeves 62 are guided in the slotted holes 18 of the adjustment plate 12, such that the adjustment plate 12 is rotatable about the central axis relative to the cover element 15 and the basic body 10.

For an adjusting movement, the adjustment plate 12 has on its outer circumference an external toothing 120 which cooperates with a drive 7. In the exemplary embodiment illustrated, a manual drive 7 is provided, wherein a drive shaft 70 can be rotated about its axis by means of a crank (not illustrated) or the like. The drive shaft 70 drives a gear wheel (not illustrated) that cooperates with the external toothing 120. Alternatively, a motorized drive of the drive shaft 70 is conceivable.

Figure 7:
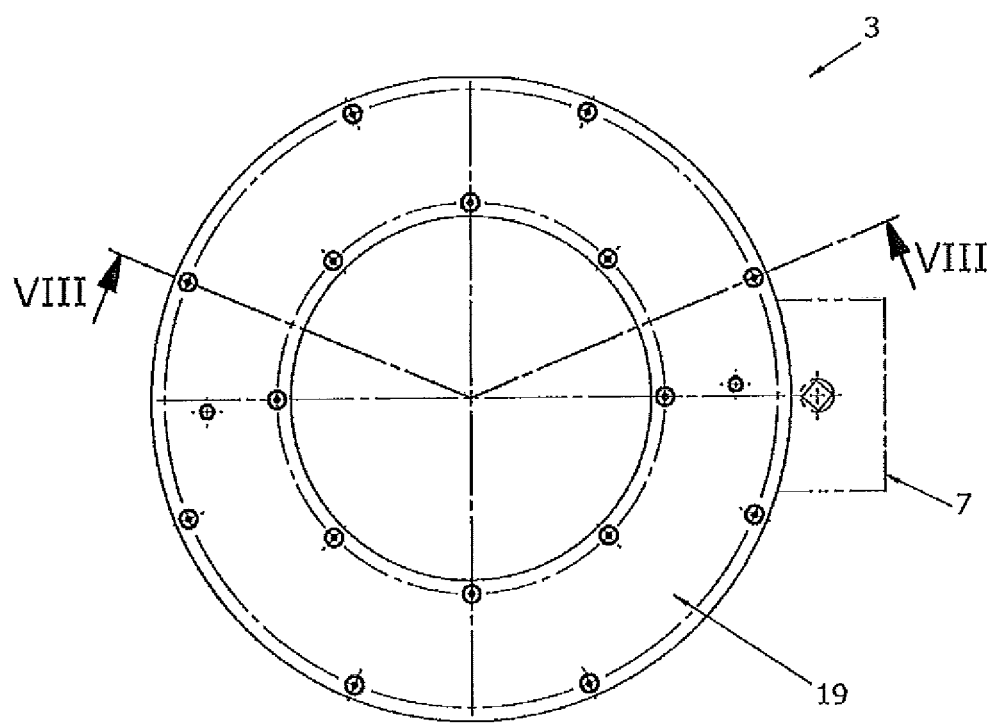
FIG. 7 shows a plan view of the device according to FIG. 6.
Figure 8:
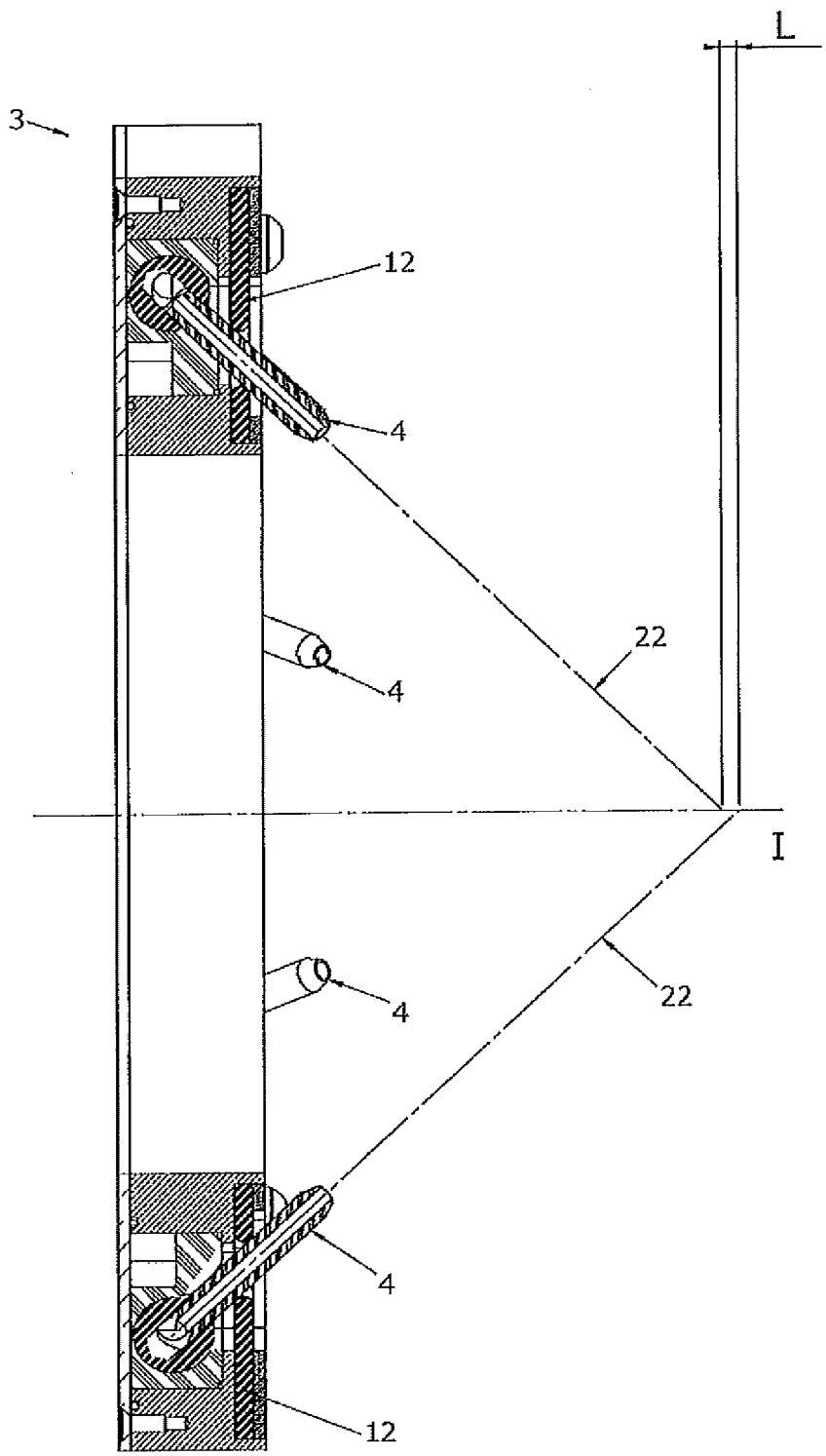
FIG. 8 shows a section through the device according to FIG. 6 along a plane VIII-VIII according to FIG. 6 in a first inclined position.
Figure 9:
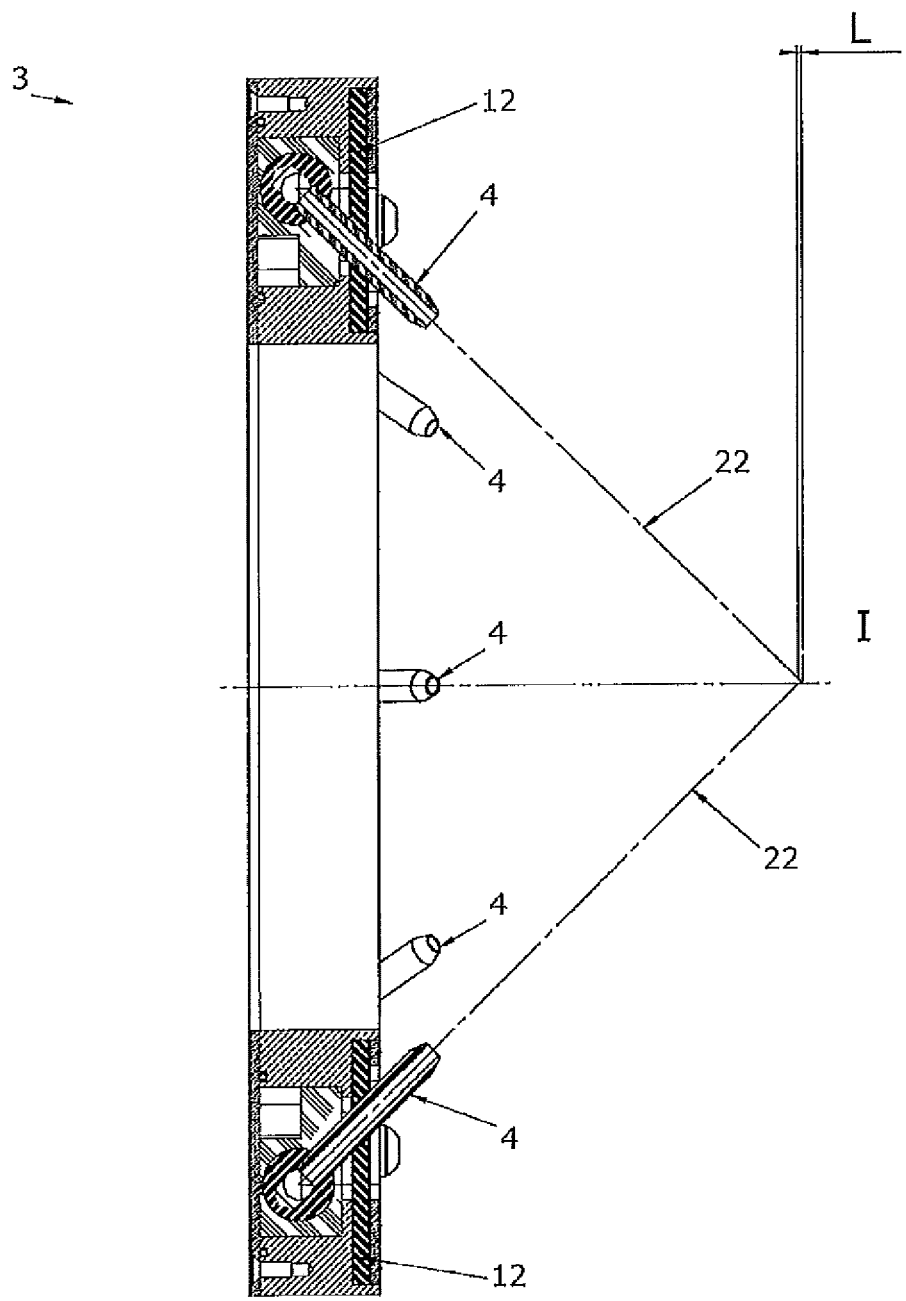
FIG. 9 shows a section through a device similar to FIG. 6 along a plane VIII-VIII according to FIG. 6 in a first inclined position.
Figure 10:
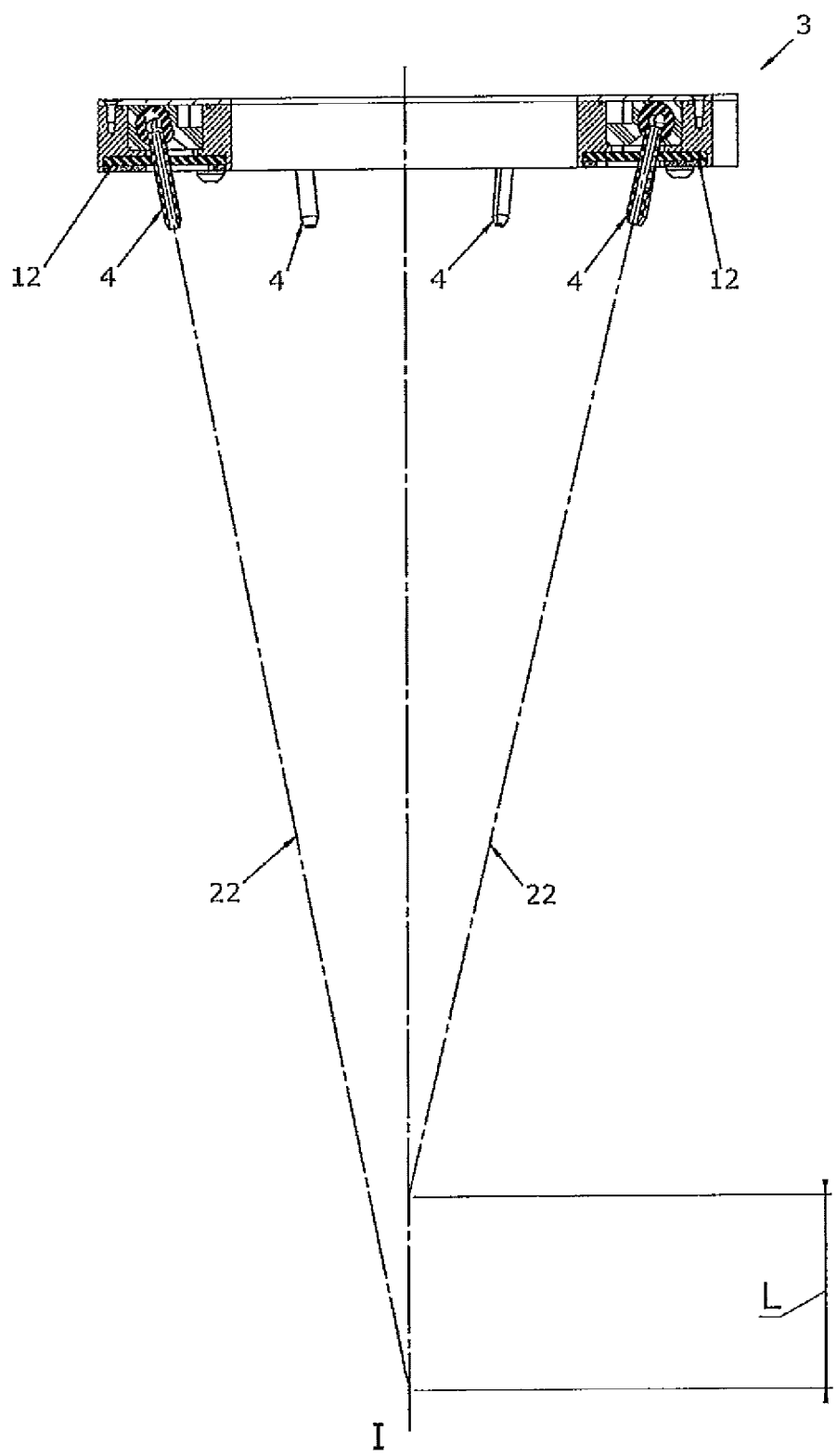
FIG. 10 shows a section through the device according to FIG. 6 along a plane VIII-VIII according to FIG. 6 in a second inclined position.

FIG. 7 shows a plan view of the device 3 according to FIG. 6 and FIGS. 8 and 10 show sectional illustrations of the device 3 according to FIG. 6 along a plane VIII-VIII according to FIG. 6 in two different inclined positions of the nozzles 4, wherein an adjustment plate 12 according to FIG. 2 is provided. FIG. 9 shows a sectional illustration of a device 3 similar to FIG. 6 along a plane VIII-VIII according to FIG. 6, wherein an adjustment plate 12 according to FIG. 3 is provided.

As can be seen in FIGS. 8 to 10, the nozzles 4 have mutually different angles or inclined positions with regard to the central axis I, such that coolant jets 22 emerging from the nozzles 4 are directed at two different points on the central axis I. When the inclined position of the nozzles 4 is changed by rotation of the adjustment plate 12, the spacing L between the points of intersection of the coolant jets 22 with the central axis I changes in accordance with the trigonometric formulas. If the device 3 is furthermore also mounted on a machine tool so as to be displaceable along the central axis I, virtually limitless adaptation of a directed feed of coolant to very different requirements is possible.

The basic shape of the adjusting device 1 in the form of a circular ring is merely by way of example. Other shapes are conceivable. For example, it is also conceivable to provide a basic shape in the form of a circular ring segment, which allows the device 3 to be moved towards a machine tool transversely to the tool head thereof.

Figure 11:
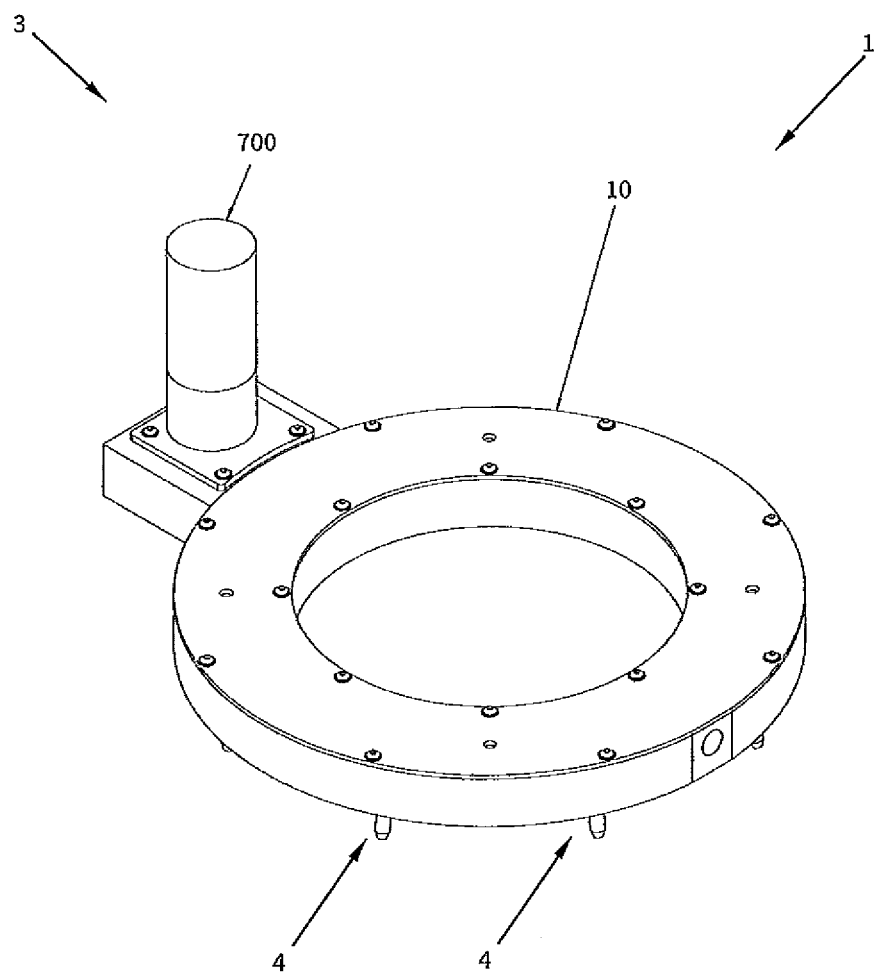
FIG. 11 shows a second embodiment of a device similar to FIG. 6 in a perspective illustration.
Figure 12:
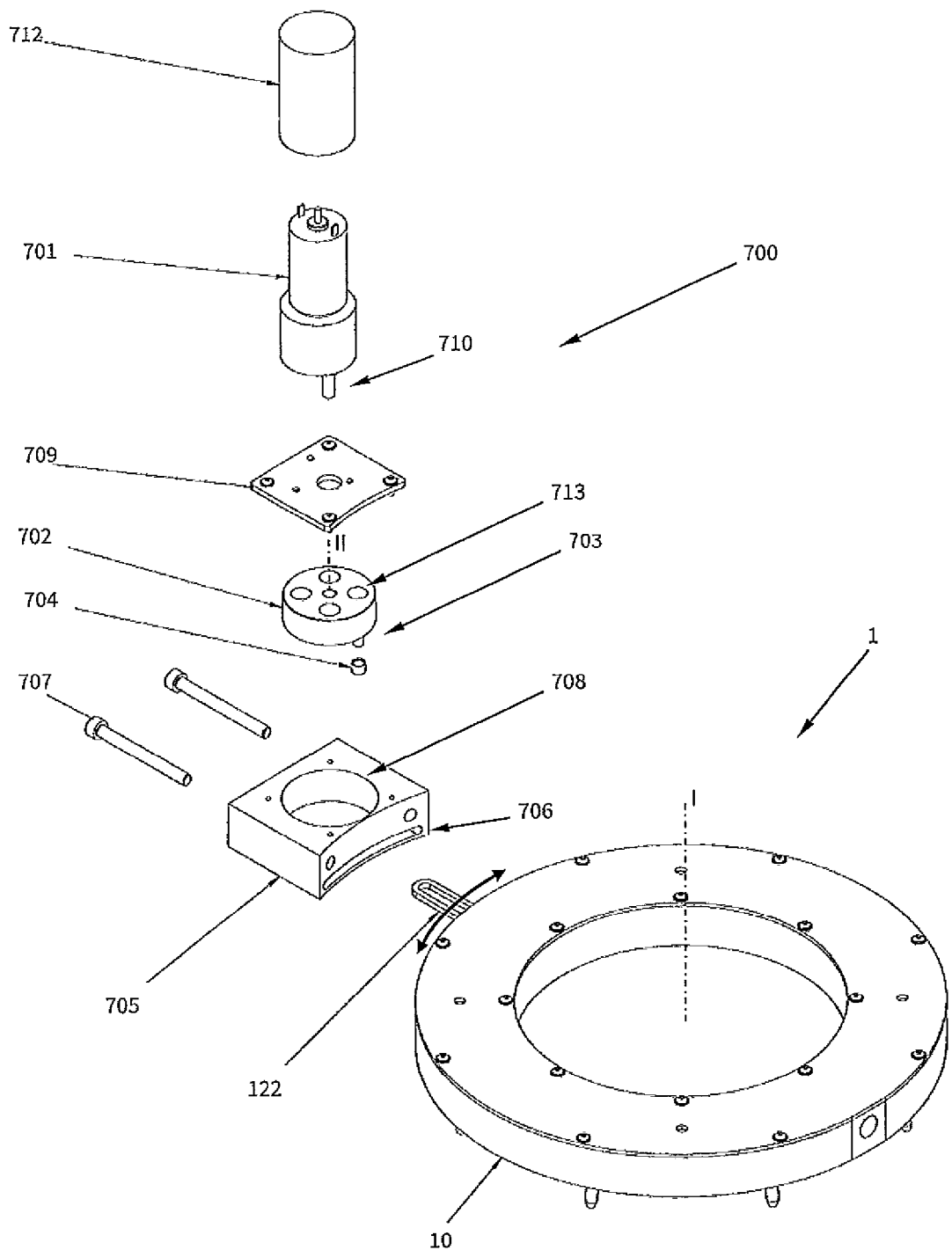
FIG. 12 shows the device according to FIG. 11 in an exploded illustration.
Figure 13:
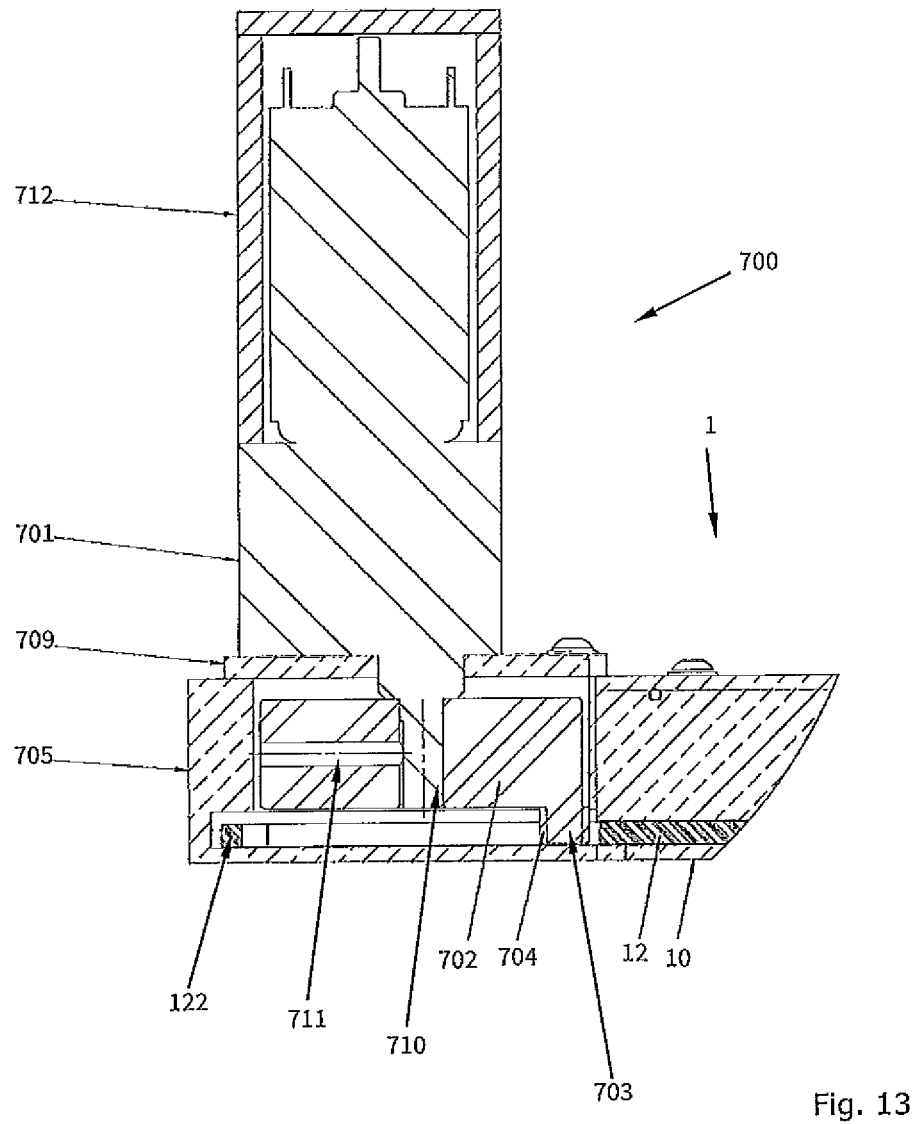
FIG. 13 shows a detail of the device according to FIG. 11 in a sectional illustration.

FIGS. 11 to 13 show an alternative configuration of a device 3 for directing manufacturing aids in a perspective illustration, an exploded illustration and a sectional view. The device 3 is similar to the device 3 according to FIG. 6 and corresponding reference signs are used for identical or similar parts.

The device 3 according to FIGS. 11 to 13 comprises a plurality of nozzles 4 designed as coolant nozzles and an adjusting device 1, by means of which the nozzles 4 are pivotable. The adjusting device 1 comprises a basic body 10 and an adjustment plate 12 (not visible in FIG. 11), having an adjusting lever 122 projecting in the radial direction. By applying a force to the adjusting lever 122 in the circumferential direction—as illustrated schematically by a double arrow in FIG. 12—the adjustment plate 12 is rotatable about the central axis I. In contrast to the preceding configuration, an electromotive drive apparatus 700 for moving the adjustment plate 12 is provided.

The electromotive drive apparatus 700 comprises an actuator 701 and an eccentric 702 having an eccentric pin 703. The eccentric 702 is rotatable about an eccentric axis II extending parallel to the central axis. The eccentric pin 703 engages in a slotted hole provided in the adjusting lever 122. The eccentric 702 and the adjusting lever 122 form a coupling mechanism, wherein the rotary movement of the eccentric 702 about the eccentric axis II is converted into a reciprocating oscillating movement of the adjusting lever 122 and thus of the adjustment plate 12 about the central axis I. As a result of the eccentric 702 being rotated about the eccentric axis II, the adjustment plate 12 is rotated about the central axis. The spacing of the eccentric axis II from the central axis I and the dimensions of the eccentric 702 and of the adjusting lever 122 are in this case selected such that, in the event of a complete rotation of the eccentric 702 through 360°, the adjusting lever 122 is moved between two maximum positions. In order for the eccentric pin 703 to be guided in the adjusting lever 122 with little wear and/or to avoid frictional forces, a guide sleeve 704 is provided on the eccentric pin 703 in the exemplary embodiment illustrated.

The eccentric 702 and the adjusting lever 122 are received in a housing 705. The adjusting lever 122 is introduced into the housing 705 via a slot 706. In one exemplary embodiment, the housing 705 serves as an additional movement limiter for the adjusting lever 122. However, the adjusting lever 122 and the housing 705 are preferably designed, such that the adjusting lever 122 does not strike the housing 705 during the movement.

The housing 705 is fastened to the basic body 10 of the adjusting device 1 by means of two screws 707.

The housing 705 furthermore has an upwardly open cutout 708 in the form of a circular cylinder, in which the eccentric 702 is received so as to be rotatable about the eccentric axis II. The cutout 708 is closed by means of a plate 709. The actuator 701 is attachable to the side of the plate 709 away from the housing 705, wherein a drive shaft 710 of the actuator 701 is guided via a cutout in the plate 709 and is connected to the eccentric 702 by means of a threaded pin 711 (see FIG. 13). Alternative connection possibilities, for example by means of a screw, by means of a dowel pin or the like are conceivable. The actuator 701 is furthermore covered by means of a motor guard 712. The motor guard 712 has a non-destructively removable cover for easier access.

In the exemplary embodiment illustrated, the eccentric 702 has four cutouts 713 by way of which a weight of the eccentric 702 is reducible. In addition, sensors, for example Hall sensors or the like, which make it possible to determine the position of the eccentric 702, are insertable into the cutouts 713.

Figure 14:
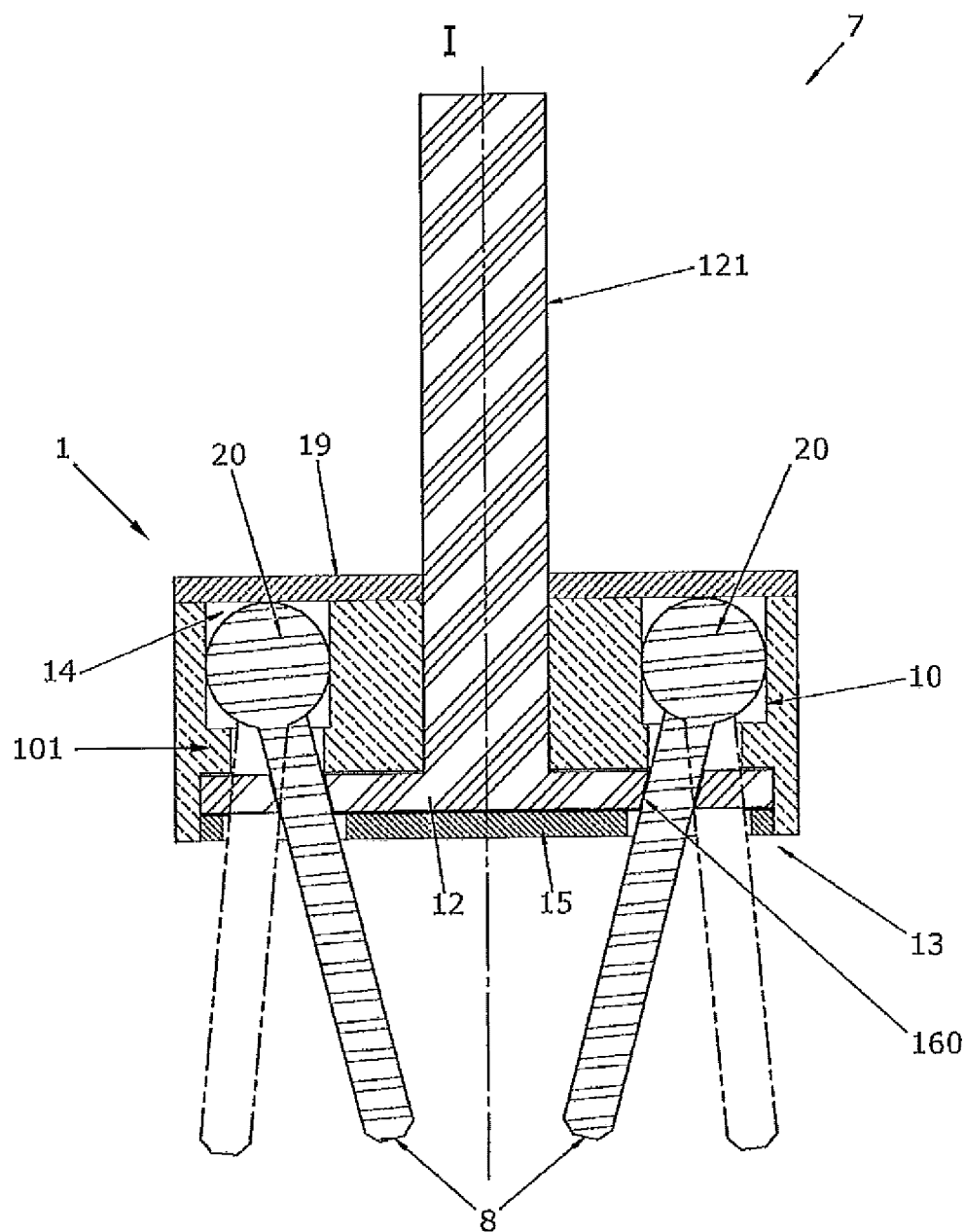
FIG. 14 shows a sectional side view of a gripper device with an adjusting device.
Figure 15:
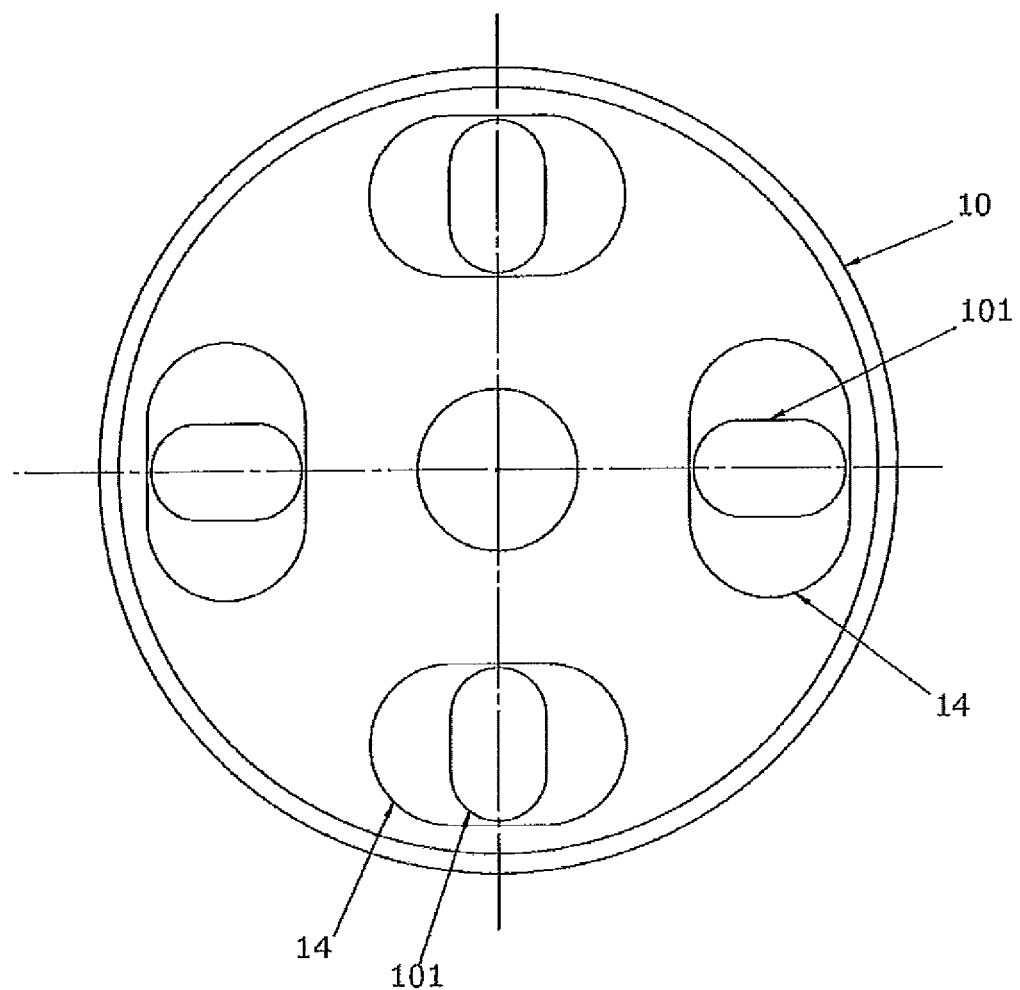
FIG. 15 shows a plan view of a basic body of the adjusting device according to FIG. 14.
Figure 16:
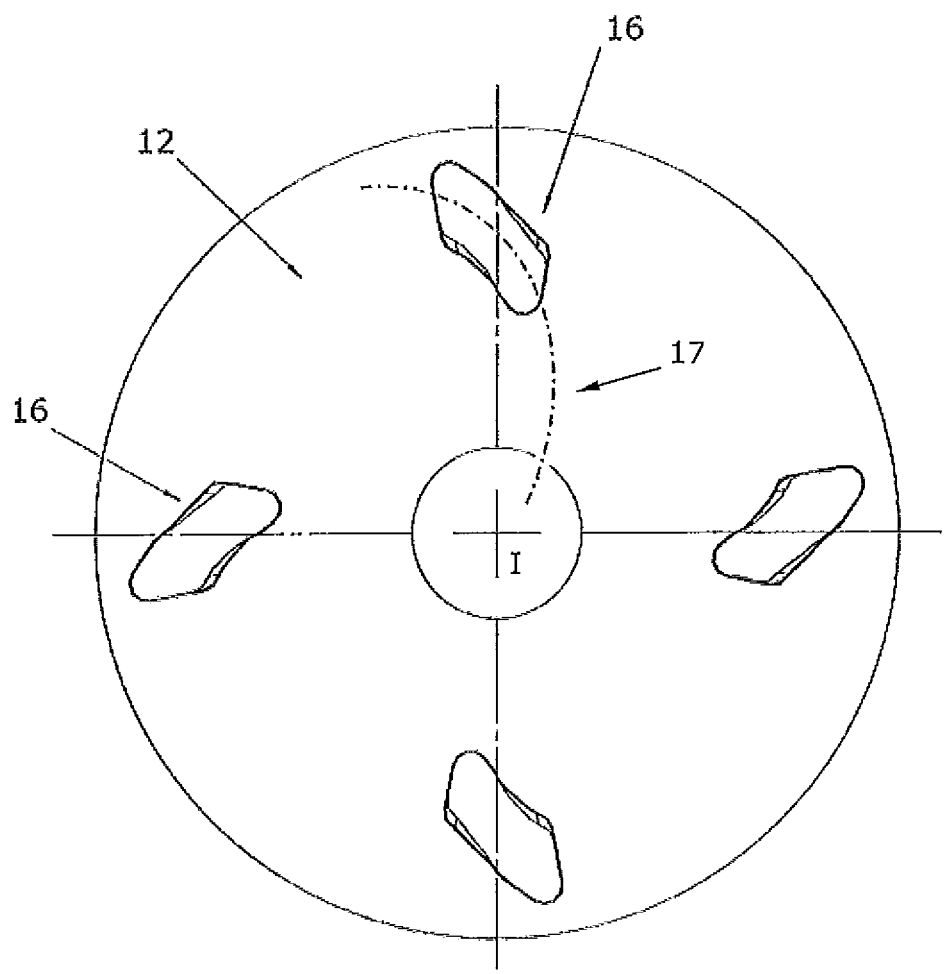
FIG. 16 shows a plan view of an adjustment plate of the adjusting device according to FIG. 14.

FIGS. 14 to 16 show an alternative application of an adjusting device 1 according to the invention in a gripper device 7, wherein FIG. 14 shows a sectional side view of the gripper device 7, FIG. 15 shows a plan view of a basic body 10 of the associated adjusting device 1 and FIG. 16 shows a plan view of an adjustment plate 12 of the associated adjusting device 1.

Adjustment objects of the adjusting device 1 are four fingers 8, which are each mounted on the basic body 10 so as to be pivotable about a tangential pivot axis. For this purpose, each finger 8 has a bearing shaft 20, said bearing shafts 20 being received in bearing receptacles 14. On a side of the bearing receptacles 14 that faces the adjustment plate 12, the basic body 10 has through-openings 101 through which the fingers 8 are guided. In the exemplary embodiment illustrated, the through-openings 101 are designed as slotted holes that extend in the radial direction.

Provided on a side of the basic body 10 away from the bearing receptacles 14 is a cutout 13 into which the adjustment plate 12 and a cover element 15 are inserted. The cover element 15 likewise has cutouts for the fingers 8 in this case. As described above, these are designed preferably as slots that extend in the radial direction.

As can be seen in FIG. 16, the adjustment plate 12 has guide slots 16, the centrelines of which extend along a spiral path 17 about the central axis I.

A width of the guide slots 16 in the radial direction is varied in order to compensate for a required degree of opening on account of a varying inclined position of the fingers 8 with regard to the central axis. In this case, as can be seen in FIG. 14, provision is made for the fingers 8 to pivot in both directions from a zero position oriented parallel to the central axis I. The width of the slots 16 therefore increases in each case towards the ends such that the fingers 8 are guided at least substantially without play in the guide slots 16 in each inclined position.

In order to take a varying inclined position of the adjustment objects 2 with regard to the central axis I into account, walls 160 of the guide slots 16 have an inclination angle that varies continuously with the inclined position over a course along the spiral path 17, such that the adjustment objects 2—as can be seen in FIG. 14—touch the guide slots 16 along a line. In other configurations, the walls 160 have radii.

The fingers 8 have corresponding inclined positions with regard to the central axis I, i.e. the fingers 8 are all directed towards a common point on the central axis I.

In order to initiate an adjusting movement of the fingers 8, the adjustment plate 12 has a shaft 121 which is couplable to a drive (not illustrated). However, other drives, for example by means of the above-described external toothing, the above-described coupling mechanism or the like, are also conceivable.

The illustrated applications of the adjusting device 1 are merely by way of example. Further applications are conceivable.

The invention claimed is:

1. An adjusting device comprising a basic body, an adjustment plate mounted on the basic body so as to be rotatable about a central axis, and at least two adjustment objects mounted on the basic body so as to be pivotable about tangential pivot axes, wherein the adjustment plate has at least two guide slots, arranged in a manner distributed around a circumference of the adjustment plate, for accommodating the adjustment objects, wherein centrelines of the guide slots are each arranged about the central axis and each extends along a spiral path, and wherein, in order to take a varying inclined position of the adjustment objects with regard to the central axis into account, a width of the guide slots varies over a course along the spiral path.

2. An adjusting device comprising a basic body, an adjustment plate mounted on the basic body so as to be rotatable about a central axis, and at least two adjustment objects mounted on the basic body so as to be pivotable about tangential pivot axes, wherein the adjustment plate has at least two guide slots, arranged in a manner distributed around a circumference of the adjustment plate, for accommodating the adjustment objects, wherein centrelines of the guide slots are each arranged about the central axis and each extends along a spiral path, and wherein, in order to take a varying inclined position of the adjustment objects with regard to the central axis into account, walls of the guide slots have an inclination angle that varies continuously with the inclined position over a course along the spiral path.

3. The adjusting device according to claim 2, wherein each of the adjustment objects is provided with a bearing shaft and the basic body has bearing receptacles for the adjustment objects, wherein the adjustment objects are mounted in the bearing receptacles by the respective bearing shafts so as to be pivotable about positionally fixed tangential pivot axes.

4. The adjusting device according to claim 2, wherein the basic body has a rotationally symmetrical cutout, wherein the adjustment plate is mounted in the rotationally symmetrical cutout so as to be rotatable about the central axis.

5. The adjusting device according to claim 2, further including a cover element for covering the adjustment plate, wherein the cover element has slots that extend in the radial direction from the central axis.

6. The adjusting device according to claim 2, wherein the adjustment plate has, on an outer circumference, a toothing and/or an adjusting lever for a drive.

7. The adjusting device according to claim 2, further including an electromotive adjusting device comprising an actuator for an adjusting movement of the adjustment objects.

8. The adjusting device according to claim 7, further including a coupling mechanism, wherein the actuator of the electromotive adjusting device is connected to the adjustment plate in a driving manner by the coupling mechanism.

9. The adjusting device according to claim 8, wherein the coupling mechanism comprises an eccentric that is rotatable about an eccentric axis.

10. The adjusting device according to claim 2, wherein the adjustment plate has a shaft for a drive arranged coaxially with the central axis.

11. A device for directing manufacturing aids for a machine tool, comprising an adjusting device according to claim 2, wherein the adjustment objects are in the form of nozzles.

12. The device according to claim 11, wherein the nozzles are in the form of coolant nozzles.

13. The device according to claim 11, wherein the nozzles have inclined positions with regard to the central axis that differ from one another.

14. The device according to claim 11, wherein more than two nozzles are provided, wherein at least some of the nozzles have inclined positions with regard to the central axis that correspond with one another in groups or in pairs.

15. The device according to claim 11, wherein the basic body and the adjustment plate each have a basic shape in the form of a circular ring or a circular ring segment.

16. A gripper device comprising an adjusting device according to claim 2, wherein the adjustment objects are in the form of movable fingers.

17. The gripper device according to claim 16, wherein three, four or more fingers are provided, the fingers having inclined positions with regard to the central axis that correspond with one another.

18. An adjusting device comprising a basic body, an adjustment plate mounted on the basic body so as to be rotatable about a central axis, and at least two adjustment objects mounted on the basic body so as to be pivotable about tangential pivot axes, wherein the adjustment plate has at least two guide slots, arranged in a manner distributed around a circumference of the adjustment plate, for accommodating the adjustment objects, the adjusting device further comprising a coupling mechanism and an electromotive adjusting device including an actuator for an adjusting movement of the adjustment objects, wherein the actuator of the electromotive adjusting device is connected to the adjustment plate in a driving manner by the coupling mechanism, and wherein the coupling mechanism comprises an eccentric that is rotatable about an eccentric axis.

* * * * *